(12) United States Patent  
Arimoto (10) Patent No.: US 6,674,061 B1  
(45) Date of Patent: Jan. 6, 2004

(54) CONTACT IMAGE SENSOR UNIT (75) Inventor: Hironobu Arimoto, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 205 days.

(21) Appl. No.: 09/617,808

(22) Filed: Jul. 17, 2000

(30) Foreign Application Priority Data

Feb. 18, 2000 (JP) ........................................ 2000-041919

(51) Int. Cl.⁷ ............................................... H01L 27/00
(52) U.S. Cl. ..................... 250/208.1; 250/235; 313/491
(58) Field of Search .......................... 250/208.1, 227.2, 250/235; 358/474, 482, 483; 257/99, 698, 690, 80, 81, 82, 484; 313/491, 492, 494, 498, 502, 503, 506, 495

(56) References Cited

U.S. PATENT DOCUMENTS 5,486,738 A * 1/1996 Saika et al. ............... 315/169.3
5,523,555 A * 6/1996 Friend et al. ............ 250/214 R
6,259,084 B1 * 7/2001 Kochis et al. ............ 250/208.1

FOREIGN PATENT DOCUMENTS

| JP | 62-176960 | * | 11/1987 | ............ H01J/61/54 |
| JP | 63-029935 |   | 6/1988  |                        |
| JP | 63/146343 | * | 6/1988  | ............ H01J/65/00 |
| JP | 3-110750  | * | 9/1989  | ............ H01J/61/30 |
| JP | 3-110750  |   | 5/1991  |                        |
| JP | 3-225743  | * | 10/1991 | ............ H01J/61/30 |
| JP | 4-360458  |   | 12/1992 |                        |
| JP | 8-287869  |   | 11/1996 |                        |

* cited by examiner

Primary Examiner—Robert H. Kim  
Assistant Examiner—Glen Kao  
(74) Attorney, Agent, or Firm—Oblon, Spivak, McClelland, Maier & Neustadt, P.C.

(57) ABSTRACT

A discharging and light emitting element included in a CIS unit includes a transparent electrode having an external electrode and a substrate having an internal electrode. A first lead is led out from the internal electrode and a second lead is led out from the external electrode, and first and second leads are led out from end portions of the substrate and the transparent electrode at the same side.

2 Claims, 9 Drawing Sheets

CONTACT IMAGE SENSOR UNIT

BACKGROUND OF THE INVENTION

1. Field of the Invention

The present invention relates to contact image sensor units and more particularly to electrode lead-out structures of light sources included in contact image sensor units.

2. Description of the Background Art

Contact image sensors (CIS's) for reading contents such as diagrams shown on manuscripts conventionally have been known.

Figure 15:
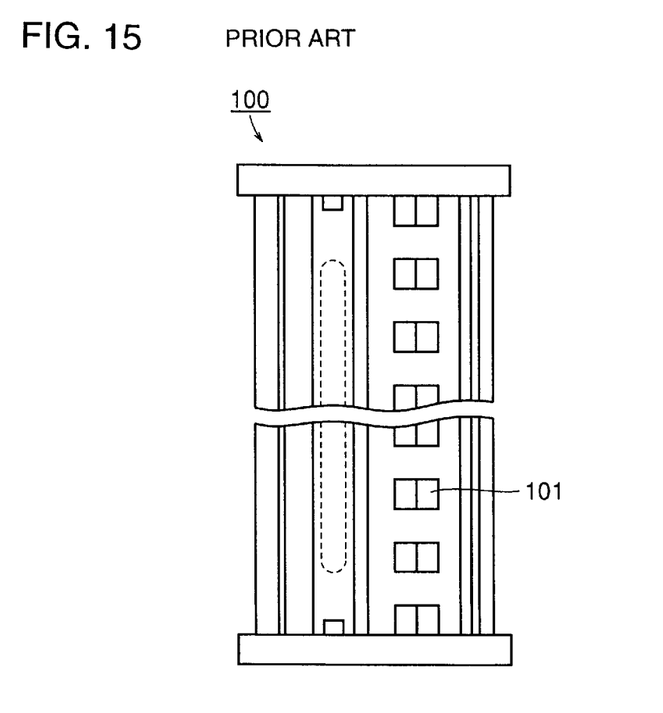
FIG. 15 is a plan view of a conventional CIS.
Figure 16:
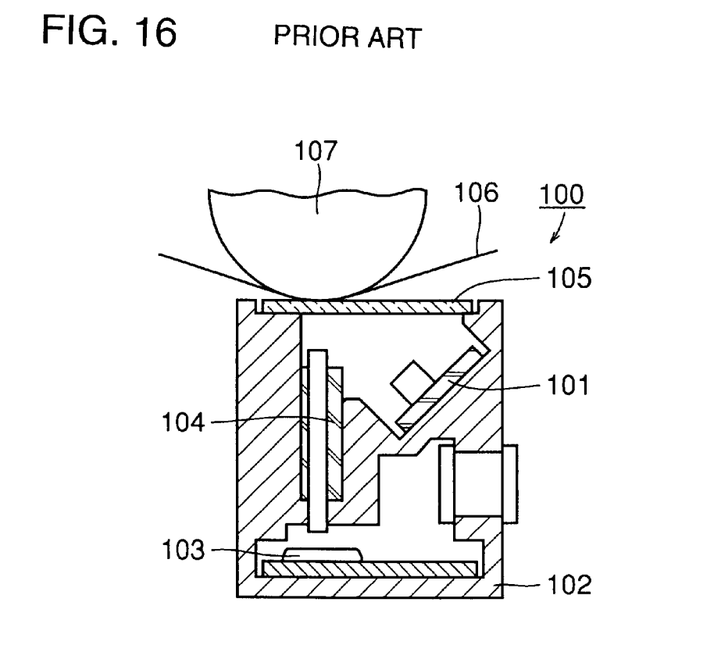
FIG. 16 is a section of a CIS shown in FIG. 15.

In FIGS. 15 and 16, one example of a conventional CIS unit 100 is shown. FIG. 15 is a plan view of CIS 100 disclosed in Japanese Patent Laying-Open No. 4-360458 (Japanese Patent No. 2953595) and, FIG. 16 is a sectional view of CIS unit 100 shown in FIG. 15.

As shown in FIGS. 15 and 16, CIS unit 100 includes a light emitting diode (LED) array 101 as a light source, a casing 102, a sensor IC (Integrated Circuit) 103, a rod lens array 104 and a glass plate 105.

LED array 101 directs light on a manuscript 106 placed between a platen 107 and glass plate 105 and, the reflected light passes through rod lens array 104 and reaches sensor IC 103. Then, the reflected light is converted into an electrical signal by sensor IC 103 and thus the content of manuscript 106 is read.

When LED array 101 is employed as the light source of the contact image sensor unit as described above, however, the following problems arise.

When the LED chip is employed, as a light output of an LED chip has a strong directivity and an amount of light directed forward largely differs from an amount of light directed diagonally forward, the following problems arise. When the LED chips are arranged to form a linear light source, due to a constraint in a mounting pitch, a gap is formed between LED chips and the amount of light on the LED chip becomes different from the amount of light on the gap. Hence, a corrugation of the light amount is produced (the light amount fluctuates) according to the LED mounting pitch in a direction the LED chips are arranged.

In addition, due to a fluctuation in a mounting accuracy of the LED (the accuracy of centers of light emission of the LED's to be aligned on a line) and the directivity of the light as described above, the corrugation (fluctuation) mentioned above further increases.

In addition, as brightness of the LED chips themselves largely differ from each other, when the LED chips are arranged, the variation in brightness appears in a distribution of brightness on the line. Thus, it is hard to obtain a uniform light amount across the entire length of the lighting.

Further, a light amount required as the light source of the image sensor varies according to a time required for the image sensor to read one line. This means that the following relation holds with regards to a signal output I of the sensor, a reading speed (read time T of one line) and brightness B of the light source: $I \propto T \times B$. Therefore, even if the LED array is employed as the light source, as far as the read time T is long enough (in the case of devices such as a facsimile, the speed of the reading of the manuscript is about ~10 ms/line), a resulting sensor output has practically no problem.

The sensor output is, however, not satisfactory in a fast reading with the reading speed of not more than 0.5 ms/line, for example.

When a strong brightness is needed, the LED chips must be mounted with high density to increase a current which contributes to light emission. Both high densification and current increase cause the heating of the light source, therefore adversely affect the life of the LED chip.

Figure 1:
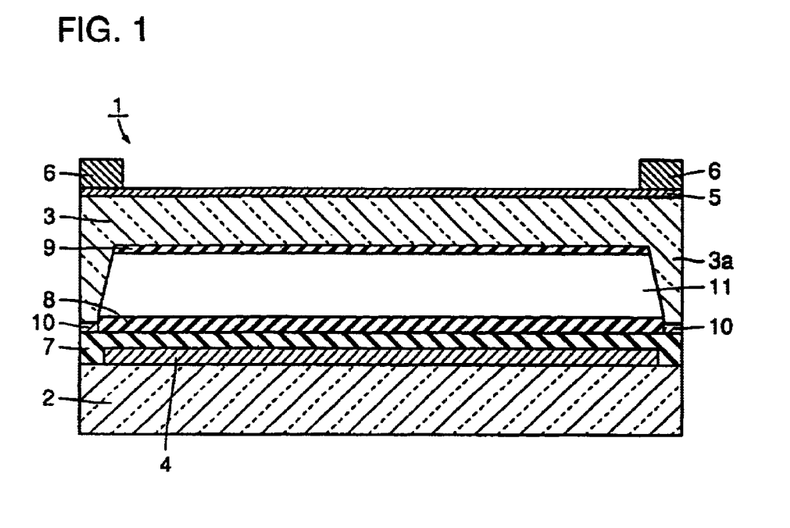
FIG. 1 is a section of a discharging and light emitting element devised by the inventor of the present invention.

Through the vigorous researches, the inventor have reached an idea of using a light source which emits light by electric discharge as the light source of the contact image sensor and, have succeeded in developing a light source of such type. In FIG. 1, an example of a structure of a discharging and light emitting element 1 usable as the light source is shown.

As shown in FIG. 1, discharging and light emitting element 1 includes a substrate 2, a transparent substrate 3, an internal electrode 4, an external electrode 5, a metal bus 6, an insulating layer (dielectric layer) 7, a first fluorescent substance 8, a second fluorescent substance 9, an sealing layer 10 and a discharging space 11.

Substrate 2 and transparent substrate 3 are formed of glass, for example. Transparent substrate 3 is placed on substrate 2 and has a wall 3a extending toward substrate 2. Wall 3a is connected to substrate 2 via sealing layer 10 and insulating layer 7. Thus, discharging space 11 is formed between substrate 2 and transparent substrate 3. In discharging space 11, a discharge gas such as xenon is charged. Here, sealing layer 10 is formed of a glass layer made by melting a frit, for example.

Internal electrode 4 is formed on substrate 2 and covered by insulating layer 7. Insulating layer 7 is formed of a glass layer, for example. On insulating layer 7, first fluorescent substance 8 is formed and, on a surface of transparent substrate 3, second fluorescent substance 9 is formed.

External electrode 5 is formed of ITO (Indium Tin Oxide) or $SnO_2$, for example, and has transmittancy. External electrode 5 is formed on an outer surface of transparent substrate 3 and metal bus 6 is formed on a peripheral portion of external electrode 5.

Figure 2:
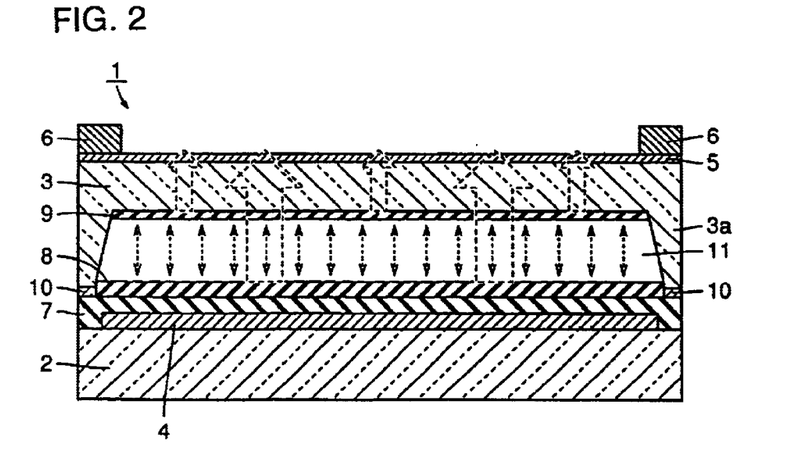
FIG. 2 is a section of a discharging and light emitting element shown in FIG. 1 emitting light.

To make discharging and light emitting element 1 with the above-described structure emit light, a voltage of a predetermined level (about 1000 V, for example) is applied between internal electrode 4 and external electrode 5. Then, the discharge gas is electrolytically dissociated and emits ultra-violet light, and the ultra-violet light is directed upon first and second fluorescent substances 8 and 9. Thus, first and second fluorescent substances 8 and 9 emit light as shown in FIG. 2.

The inventor has found that the brightness of the resulting light is stronger than that obtained in the conventional example where the LED has been employed. In addition, the brightness distribution is uniform and the life of discharging and light emitting element 1 becomes far longer than the case of LED. Still further, ratio of a effective lighting length can be improved and the size reduction in longitudinal direction can be easily realized. Still further, as no toxic substance such as mercury is employed, damage on the environment can be obviated.

Though discharging and light emitting element 1 shown in FIG. 1 has various superior characteristics to the conventional example as described above, the inventor has found the following problem in actually mounting discharging and light emitting element 1 as described above in the CIS unit.

The voltage can be applied between internal electrode 4 and external electrode 5 by leading out lead lines from respective electrodes 4 and 5 and applying the voltage through the lead lines.

When the lead lines are led out from end portions of substrate 2 and transparent substrate 3 at opposite sides, however, a big current loop running from a power supply, discharging and light emitting element 1 and to the power supply is formed. When the current flows through this loop, a large noise is externally radiated. The inventor has found that the noise affects the characteristic of the CIS unit by causing a variation of an electric signal output with time and severely degrades the performance.

SUMMARY OF THE INVENTION

The present invention is made to solve the above described problems. An object of the present invention is to provide a compact and high-performance CIS unit allowing prevention of failure caused by discharge generated by an insulation breakdown between electrodes and led-out lines, reduction in external noise, and having a line with a read width close to a CIS contour width.

A contact image sensor (CIS) unit according to the present invention includes, a discharging and light emitting element serving as a light source and a photoelectric conversion element converting light directed to a manuscript from the discharging and light emitting element and reflected from the manuscript into an electric signal. The discharging and light emitting element includes a first substrate having a first electrode and a second substrate having a second electrode and disposed on the first substrate. In addition, a first lead portion led out from the first electrode and a second lead portion led out from the second electrode are provided, and the first lead portion and the second lead portion are led out downward from the first substrate and the second substrate at end portions located at the same side. Here in the specification, the first lead portion and the second lead portion are generic terms representing conductive portions provided to electrically connect first and second electrodes with the power supply and, specifically, include any conductive members other than the lead lines.

The inventor has found after continuous researches on the position of leading-out of the lead portion, that when the lead portions are led out from ends of the first substrate and the second substrate located at the same side as described above, the path of current flow is restricted compared with the case in which the lead portions are led out from the first substrate and the second substrate at opposite ends, respectively. When the lead portions are led out from the first substrate and the second substrate at opposite ends, respectively, a big current loop from the power supply to the light source (discharging and light emitting element) and to the power supply is formed and the current flows through this loop. On the other hand, when the lead portions are led out from ends of the first substrate and the second substrate located at the same side, the path of the current loop is placed in the light emitting portion in the discharging and light emitting element. Thus, the path of current flow is restricted as mentioned above. Hence, the external noise can be reduced. In addition, by leading out first and second lead portions downward, the length of the CIS unit can be suppressed and the ratio of the effective lighting length of the discharging and light emitting element to the length of the CIS unit can be maintained high.

Preferably, the first lead portion and the second lead portion are led out from first and second substrate at one end in the longitudinal direction. Then the following advantages can be obtained.

Still preferably, the first lead portion and the second lead portion are arranged away from each other in the width direction of first and second substrates. Then, the position of leading-out of the first and the second electrodes can be placed apart from each other and the isolation distance can be secured. Thus, the failure due to the discharge caused by insulation breakdown between the electrodes and led-out lines can be prevented even when a voltage as high as 1000 Vrms is applied between the electrodes.

Preferably, the second substrate has a protrusion protruding onto said first substrate, and a first lead-out portion for leading out the first electrode is arranged below the protrusion, and a second lead-out portion for leading out the second electrode is arranged above the protrusion. The first lead portion is led out from the first lead-out portion and the second lead portion is led out from the second lead-out portion. Here, first and second lead-out portions may be formed by the extension of first and second electrodes themselves or may be formed by the arrangement of separate members electrically connected to first and second electrodes.

With the formation of the protrusion as described above, a necessary area for the lead-out portion can be secured without the increase in the length of the discharging and light emitting element. An airtight sealing of first and second substrates is performed using a frit glass softened at the temperature from 300° C. to 500° C. The frit glass is placed between sealing portions of first and second substrates and melted. The frit glass extrudes around the sealing portions toward the terminal portion, making a connection portion between the terminal and the lead line small. This may cause the difficulties in the lead line attachment. When the protrusion as described above is provided, the extrusion of the frit glass stops at the protrusion. As a space beneath the protrusion is large, the frit glass of an applied amount cannot fill up the space. Thus, the need of making a large outer shape to accommodate the frit glass extrusion is eliminated and the necessary area for the electrode lead-out portion can be secured.

The discharging and light emitting element preferably includes an insulation sheet covering the second electrode. The insulation sheet holds a first lead portion for leading out the first electrode and a second lead portion for leading out the second electrode and, suspends downward from one end of the second substrate.

The insulation sheet has an adhesive layer on one surface, for example, and holds the second electrode, first and second lead portions on the one surface. When such insulation sheet adheres to the second substrate and the lead-out portion of the first electrode, first and second lead portions are electrically connected to first and second electrodes, respectively and first and second lead portions are made suspend downward. In this case again, first and second lead portions can be provided without a substantial increase in the length of the CIS unit.

The CIS unit according to the present invention preferably includes a casing with a cap member attached to one end. In this case, the discharging and light emitting element and the photoelectric conversion element are included in the casing and first and second lead portions extend between the cap member and the casing.

Thus, by the efficient utilization of the space between the cap member and the casing, first and second lead portions can be led out without increase in the length of the CIS unit.

The first substrate may be provided with a first notch receiving the first lead portion and a second notch receiving the second lead portion and the second substrate may be provided with a third notch receiving the second lead portion.

In this case again, as respective lead portions can be housed in notches, first and second lead portions can be led out without increase in the length of the CIS unit.

When the CIS unit according to the present invention is provided with a casing with a cap member attached to one end, first and second lead portions may extend in the cap member.

Then, the need of securing an additional space specifically for the extension of first and second lead portions is eliminated and, first and second lead portions can be led out without increase in the length of the CIS unit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The preferred embodiments of the present invention will be described hereinbelow with reference to FIGS. 3 to 13.

First Embodiment

Figure 3:
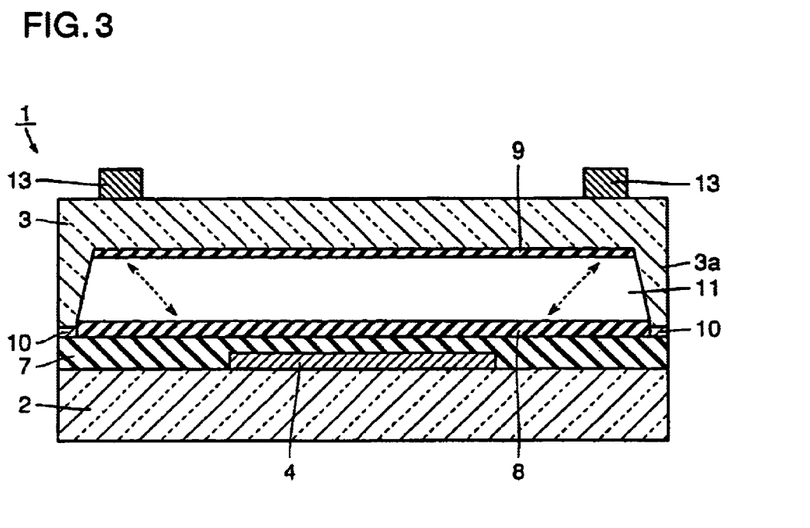
FIG. 3 is a section of an improvement of a discharging and light emitting element shown in FIG. 1.
Figure 4:
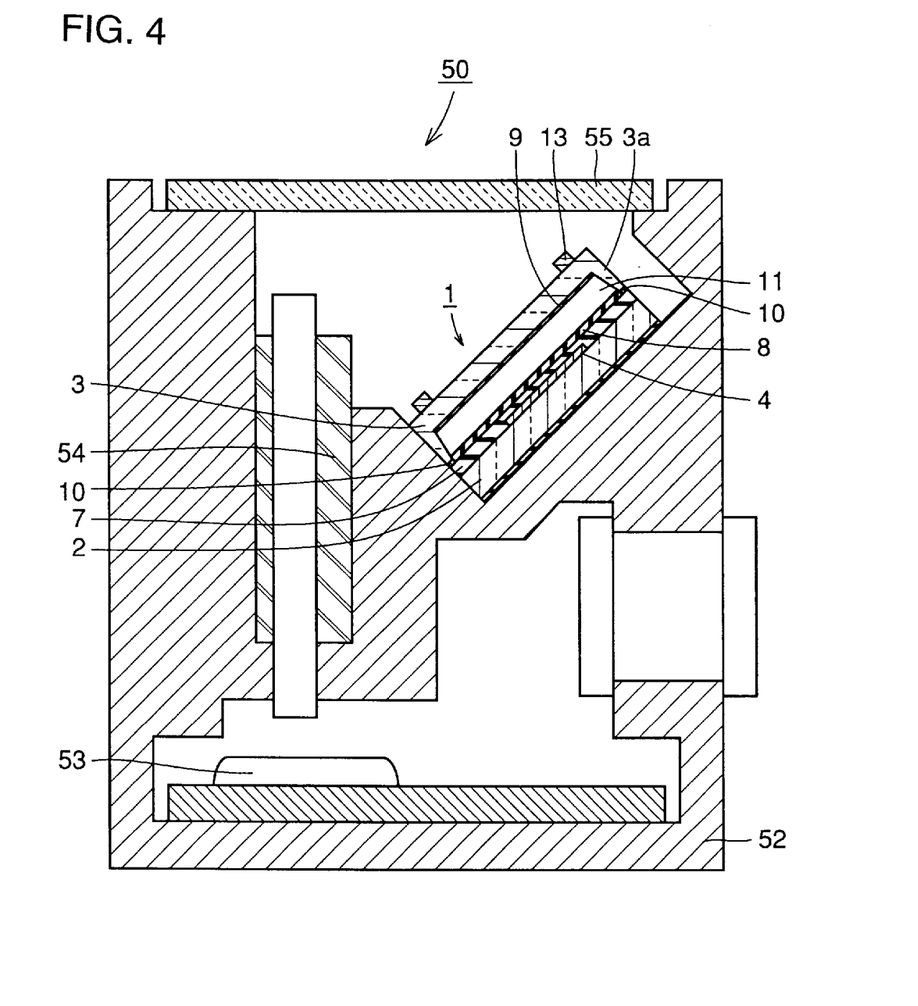
FIG. 4 is a section of a CIS unit of the present invention.

As shown in FIG. 4, a CIS unit 50 according to the present invention includes a discharging and light emitting element 1 shown in FIG. 3, a casing 52, a sensor IC (photoelectric conversion element) 53 converting light directed from discharging and light emitting element 1 to a manuscript and reflected therefrom into an electric signal, a rod lens array 54 and a glass plate 55.

Discharging and light emitting element 1 shown in FIG. 3 is an improvement of discharging and light emitting element shown in FIG. 1 and in which internal electrode 4 is disposed off from external electrode 13 in a horizontal direction and external electrode 5 is not provided. Thus, luminous efficiency is improved over the case shown in FIG. 1.

Figure 5:
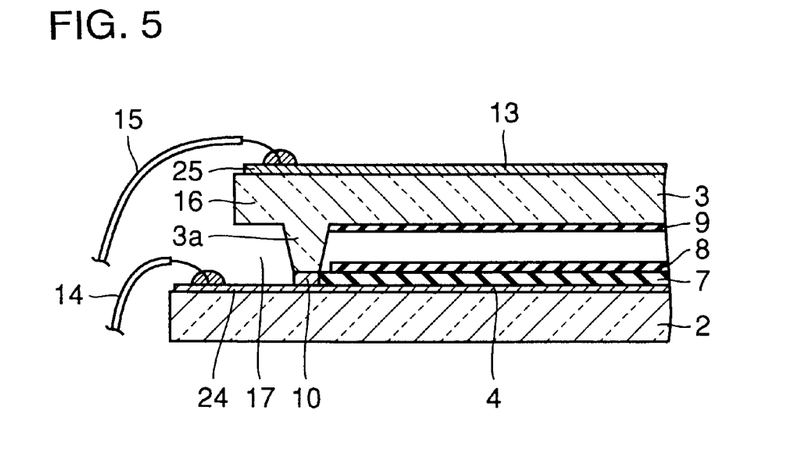
FIG. 5 is a partial section of a discharging and light emitting element according to a first embodiment of the present invention.

FIG. 5 is a partial section of discharging and light emitting element 1 according to the present invention. Here, the same portion as in discharging and light emitting element 1 shown in FIG. 3 is denoted by the same numeral and the description thereof will not be repeated.

As shown in FIG. 5, discharging and light emitting element 1 according to the embodiment includes a protrusion 16 protruding over substrate (first substrate) 2 in transparent substrate (second substrate) 3. Thus, a recess portion 17 is formed on a side surface of discharging and light emitting element 1.

A first lead-out portion 24 for leading out internal electrode 4 is arranged below protrusion 16 described above. In this case, first lead-out portion 24 is formed by extending internal electrode 4 outside the discharging space. Lead-out portion 24 can be formed by providing an additional conductive layer electrically connected to internal electrode 4.

A second lead-out portion 25 for leading out external electrode 13 is provided on protrusion 16. Second lead-out portion 25 is formed by extending external electrode 13. Second lead-out portion 25 can be formed by providing an additional conductive layer electrically connected to external electrode 13.

A first lead portion 14 is led out from first lead-out portion 24 described above and a second lead portion 15 is led out from second lead-out portion 25. In this case, lead lines are employed as first and second lead portions 14 and 15. Other conductive members can be employed for first and second lead portions 14 and 15 as well. The lead line as described above is connected to first lead-out portion 24 or second lead-out portion 25 by solder, for example.

With protrusion 16 provided as described above, a sufficient area for the lead-out portion can be secured without increase in the length of discharging and light emitting element 1.

As shown in FIG. 5, first and second lead portions 14 and 15 are led out downward from end portions of substrate 2 and transparent substrate 3 located at the same side.

The inventor has found, after continuous researches of a lead-out position of the lead portion, that when the lead portions are led out from end portions of substrate 2 and transparent substrate 3 located on the same side as described above, a path of a current flow is limited compared with the case where the lead portions are led out respectively from substrate 2 and transparent substrate 3 at opposite ends.

When the lead portions are led out from substrate 2 and transparent substrate 3 at opposite ends, respectively, a big current loop from a power supply to a light source (discharging and light emitting element) and to the power supply is formed and the current flows through the loop. On the other hand, when first and second lead portion 14 and 15 are led out from substrate 2 and transparent substrate 3 at end portions located at the same side, the path of the current loop is placed in a light emitting portion in discharging and light emitting element 1. Hence, the path the current flows is limited as mentioned above. Thus, the external noise can be reduced.

In addition, it is preferable that first and second lead portions 14 and 15 are led out from one ends in a longitudinal direction of substrate 2 and of transparent substrate 3, respectively.

Second Embodiment

Figure 6:
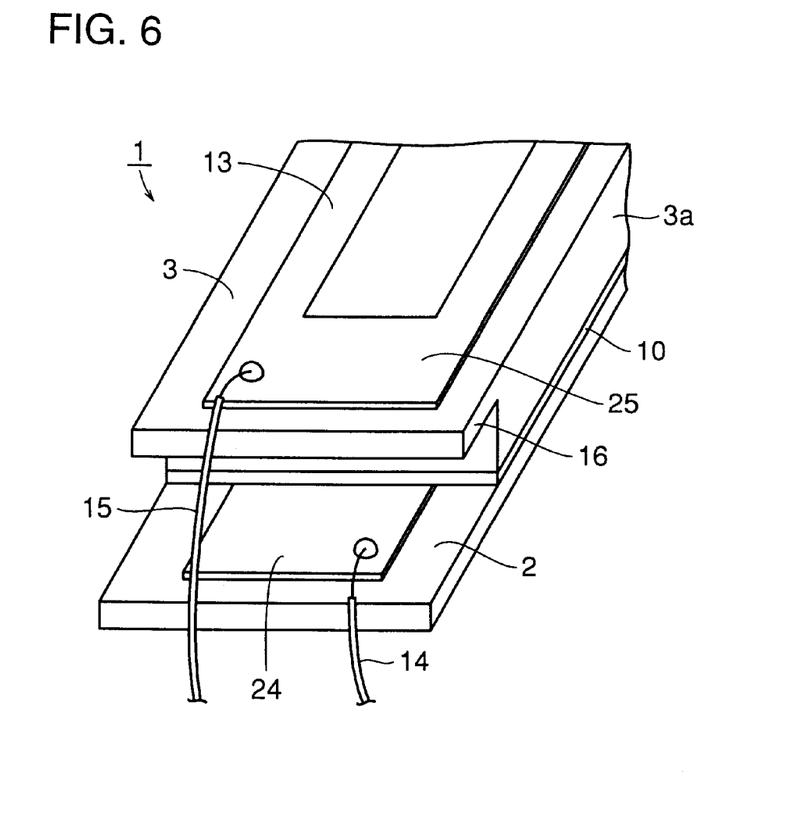
FIG. 6 is a partial perspective view of a discharging and light emitting element according to a second embodiment of the present invention.

Next, the second embodiment of the present invention will be described with reference to FIG. 6. FIG. 6 is a partial perspective view of discharging and light emitting element 1 according to the second embodiment.

As shown in FIG. 6, in the second embodiment, first and second lead portions 14 and 15 are arranged apart from each other in a width direction of substrate 2 and transparent substrate 3, respectively. Thus, the lead-out positions of internal electrode 4 and external electrode 13 can be placed apart from each other.

Thus, the positions where internal electrode 4 and external electrode 13 are led out can be placed apart from each other and an isolation distance can be secured. Thus, even when a voltage as high as 1000 Vrms is applied between electrodes, a failure due to insulation breakdown between electrodes and led-out lines can be prevented.

Third Embodiment

Figure 7:
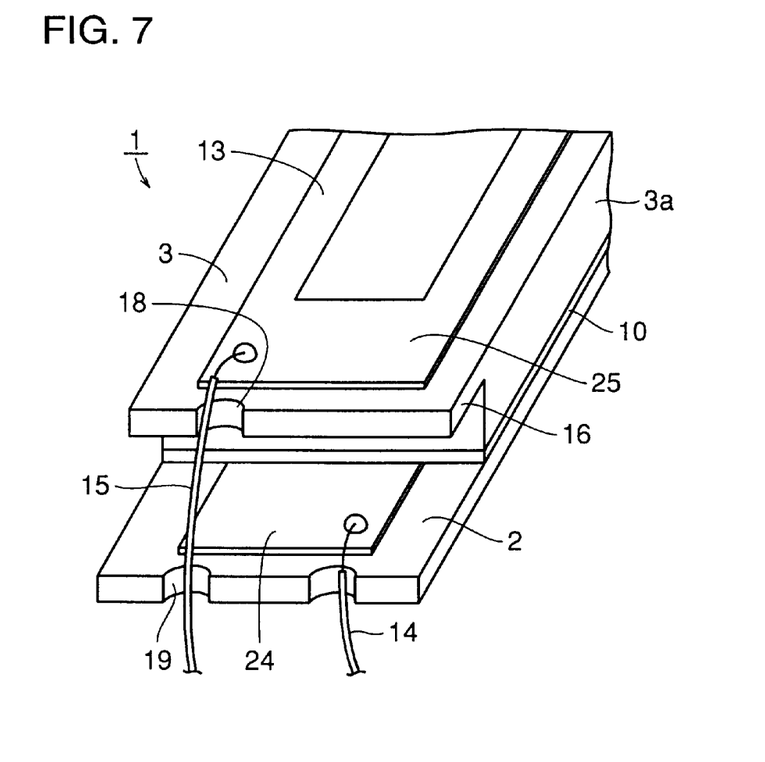
FIG. 7 is a partial perspective view of a discharging and light emitting element according to a third embodiment of the present invention.

Next, the third embodiment of the present invention will be described with reference to FIG. 7. FIG. 7 is a partial perspective view of discharging and light emitting element 1 according to the third embodiment.

As shown in FIG. 7, a notch 18 is formed at an end portion in a longitudinal direction of transparent substrate 3 and a pair of notches 19's is formed at an end portion in a longitudinal direction of substrate 2. Second lead portion 15 is received by notch 18 and notch 19 directly below notch 18 and, first lead portion 14 is received by another notch 19.

Therefore, it is not necessary to secure an additional space for the extension of first and second lead portions 14 and 15 and, first and second lead portions 14 and 15 can be extended without substantial increase in the length of CIS unit 50.

Fourth Embodiment

Figure 8:
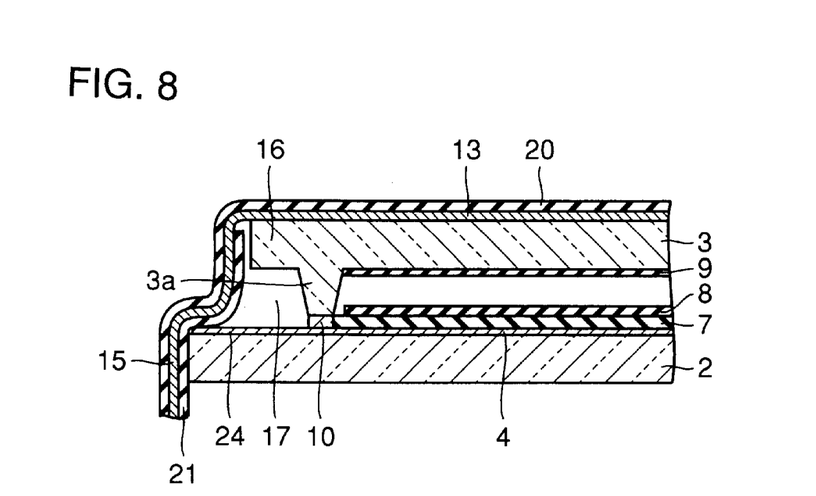
FIG. 8 is a partial section of a discharging and light emitting element according to a fourth embodiment of the present invention.

Next, the fourth embodiment of the present invention will be described with reference to FIGS. 8 to 11. FIG. 8 is a partial section of discharging and light emitting element 1 according to the fourth embodiment.

As shown in FIG. 8, an insulation sheet 20 is provided as to cover transparent substrate 3 and external electrode 13 in the fourth embodiment. Insulation sheet 20 is formed of an insulation member such as a resin and preferably is transparent. In addition, insulation sheet 20 has an adhesive layer on one surface and adheres to a surface of transparent substrate 3.

Figure 9:
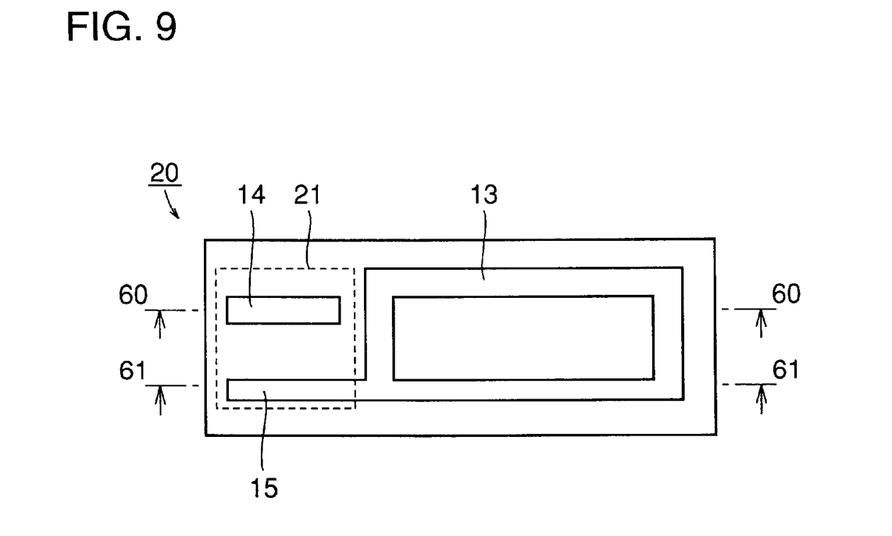
FIG. 9 is a plan view of an insulation sheet of the present invention.

Next, an example of the structure of insulation sheet 20 will be described with reference to FIGS. 9 to 11. FIG. 9 is a plan view of insulation sheet 20, FIG. 10 is a section in line 60—60 shown in FIG. 9 and FIG. 11 is a section in line 61—61 shown in FIG. 9.

Figure 10:
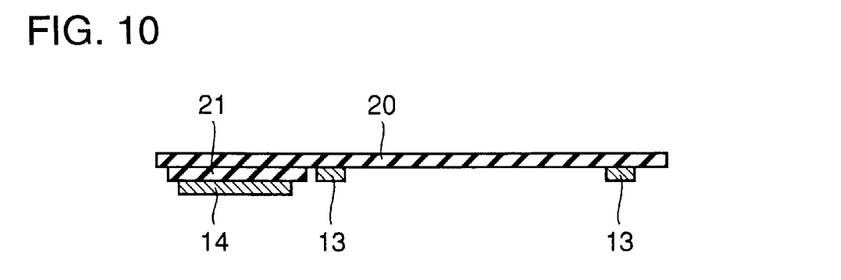
FIG. 10 is a section on line 60—60 in FIG. 9.
Figure 11:
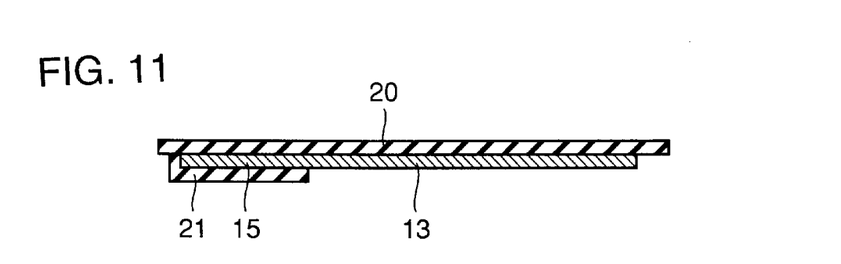
FIG. 11 is a section on line 61—61 in FIG. 9.

As shown in FIGS. 9 to 11, insulation sheet 20 holds external electrode 13, first lead portion 14 for leading out internal electrode 4, second lead portion 15 for leading out external electrode 13 and an insulation member 21.

As shown in FIG. 10, first lead portion 14 is affixed to a surface of insulation member 21 and, as shown in FIG. 11, insulation member 21 is affixed to insulation sheet 20 so as to cover second lead portion 15. By insulation member 21, the contact between second lead portion 15 and a lead-out portion of internal electrode 4 is prevented.

With reference to FIG. 8 again, insulation sheet 20 having the structure as described above suspends downward at one end of transparent substrate 3. Here, insulation member 21 or insulation sheet 20 is affixed to the lead-out portion of internal electrode 4. Thus, first lead portion 14 can be taken into contact with the lead-out portion of internal electrode 4 and, first lead portion 14 and internal electrode 4 can be electrically connected to each other.

The desired effect can be obtained simply by suspending insulation sheet 20 downward at one end of transparent substrate 3 as shown in FIG. 8, and first and second lead portions 14 and 15 can be arranged without substantial increase in the length of CIS unit 50.

Fifth Embodiment

Figure 12:
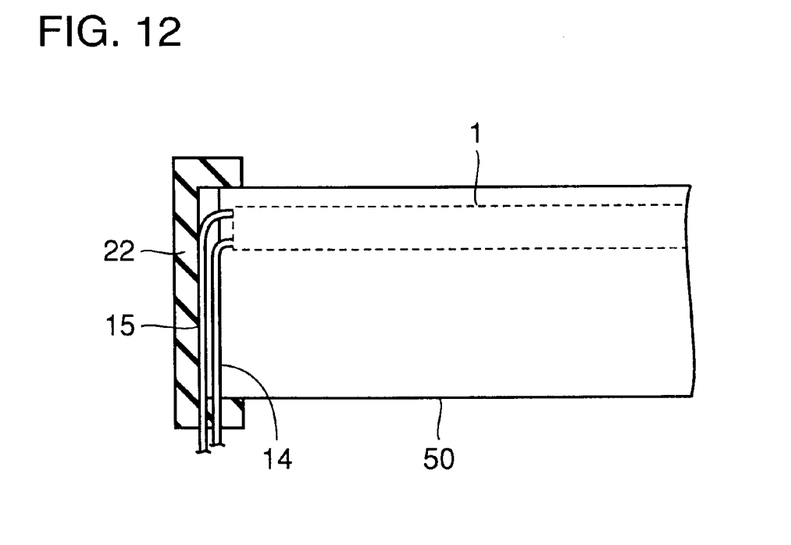
FIG. 12 is a partial side section of a CIS unit having a discharging and light emitting element according to a fifth embodiment of the present invention.
Figure 13:
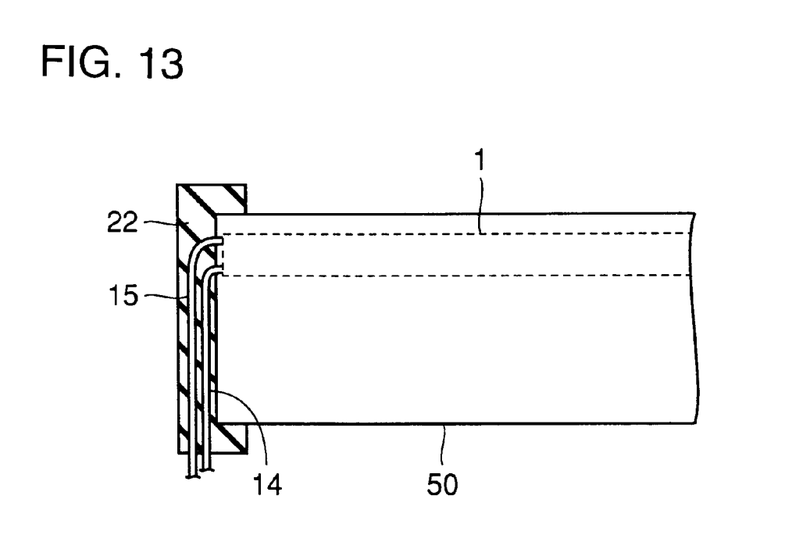
FIG. 13 is a partial side section of a modification of a CIS unit shown in FIG. 12.

Next, with reference to FIGS. 12 and 13, the fifth embodiment of the present invention and a modification thereof will be described. FIG. 12 is a partial side section of CIS unit 50 with discharging and light emitting element 1 according to the fifth embodiment. FIG. 13 is a partial side section of the modification of CIS unit 50 shown in FIG. 12.

As shown in FIG. 12, first and second lead portions 14 and 15 extend between a cap member 22 attached to each end of CIS unit 50 and the casing of CIS unit 50 in the fifth embodiment.

Thus, the space between cap member 22 and the casing can be effectively utilized and first and second lead portions 14 and 15 can be led out without substantial increase in the length of CIS unit 50.

As shown in FIG. 13, first and second lead portions 14 and 15 may extend in cap member 22. Then, the need of securing an additional space for the extension of first and second lead portions 14 and 15 is eliminated.

Sixth Embodiment

Figure 14:
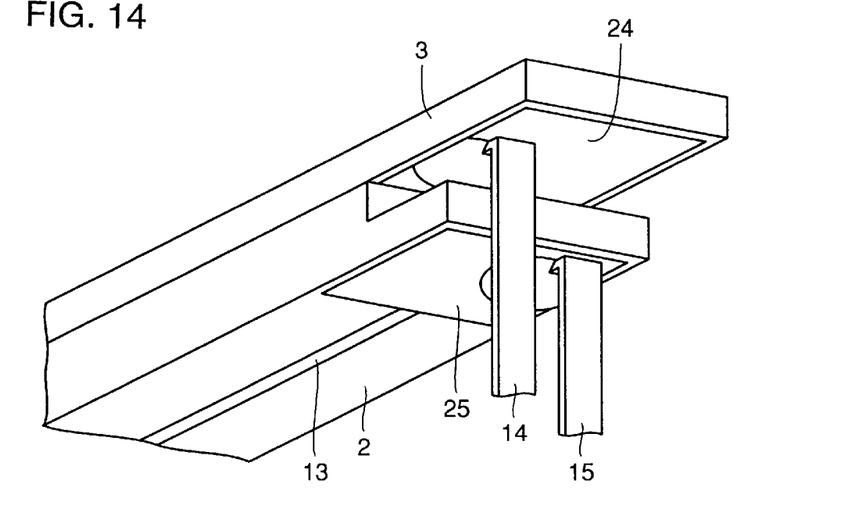
FIG. 14 is a side perspective view of a discharging and light emitting element in a sixth embodiment of the present invention.

Next, with reference to FIG. 14, the sixth embodiment of the present invention will be described. FIG. 14 is a partial perspective view of discharging and light emitting element 1 according to the sixth embodiment.

As shown in FIG. 14, in the sixth embodiment, a second lead portion 15 is provided so as to extend downward from second lead-out portion 25 electrically connected to external electrode 13 and a first lead portion 14 is provided so as to extend downward from first lead-out portion 24 for leading out internal electrode 4. First and second lead portions 14 and 15 are formed from a lead frame.

Thus, both lead portions 14 and 15 can be led out only downward and first and second lead portions 14 and 15 can be provided without substantial increase in the length of CIS unit 50.

As can be seen from the foregoing, according to the present invention, an isolation distance is provided by placing the lead-out positions of first and second electrodes away from each other and the failure due to the discharge caused by insulation breakdown between led-out lines and electrodes can be prevented even for a voltage as high as 1000 Vrms applied between electrodes. In addition, as the leading-out of the electrodes is performed only at one side, the path of current flow is restricted and the external noise is reduced, compared with the case in which leading-out is performed at opposite ends. Further, as the lead-out portion of the electrode is downsized, the read width of the line and the CIS contour become close, whereby a compact and high-performance CIS unit can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A contact image sensor unit, comprising:

a discharging and light emitting element; and a photoelectric conversion element converting light directed to a manuscript from said discharging and light emitting element and reflected from the manuscript into an electric signal, wherein said discharging and light element including a discharge space formed between a first substrate having a first electrode formed inside the discharge space and a second substrate disposed on the first substrate and having a second electrode formed outside the discharge space, an insulating layer formed in contact with and over at least part of the first electrode inside the discharge space, a first lead portion coupled to said first electrode from a first connection location outside of the discharge space at one side of the discharging and light emitting element, a second lead portion coupled to said second electrode at a second connection location not over the discharge space and at the one side of the discharging and light emitting element, and said second substrate has a protrusion protruding over said first substrate on which the second connection location is provided and said first connection location is arranged below said protrusion.

2. A contact image sensor unit, comprising:

a discharging and light emitting element; and a photoelectric conversion element converting light directed to a manuscript from said discharging and light emitting element and reflected from the manuscript into an electric signal, wherein said discharging and light element including a discharge space formed between a first substrate having a first electrode formed inside the discharge space and a second substrate disposed on the first substrate and having a second electrode formed outside the discharge space with an insulation sheet covering said second electrode, an insulating layer formed in contact with and over at least part of the first electrode inside the discharge space, a first lead portion coupled to said first electrode from a first connection location outside of the discharge space at one side of the discharging and light emitting element, a second lead portion coupled to said second electrode at a second connection location not over the discharge space and at the one side of the discharging and light emitting element, and said insulation sheet is configured to hold a part of the fist lead portion and a part of the second lead portion so that each held part extends downward from the one side of said discharging and light emitting element.

* * * * *